F. M. BECKET.
MANUFACTURE OF CALCIUM CARBID.
APPLICATION FILED APR. 10, 1916.
1,292,386.
Patented Jan. 21, 1919.
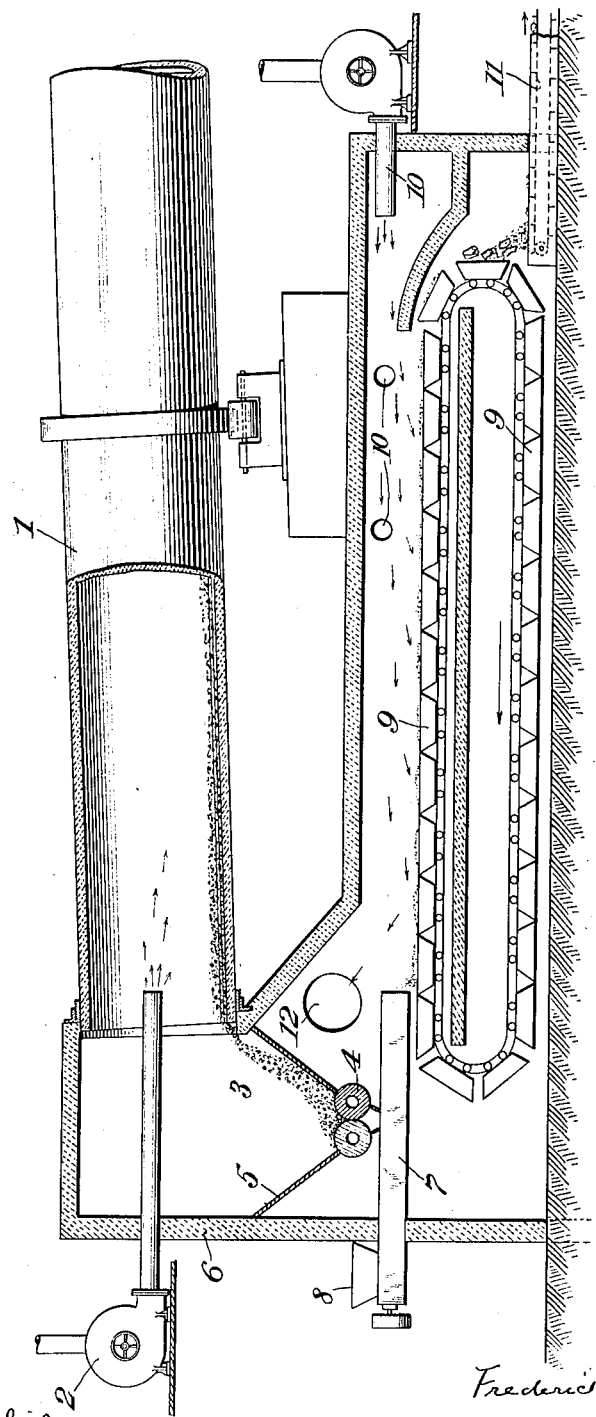
Witnesses
Inventor,
Frederick M. Becket,
By Byrnes Townsend & Bickelstein
Attorneys

UNITED STATES PATENT OFFICE.

FREDERICK M. BECKET, OF NIAGARA FALLS, NEW YORK, ASSIGNOR TO UNION CARBIDE COMPANY, OF NEW YORK, N. Y., A CORPORATION OF VIRGINIA.

MANUFACTURE OF CALCIUM CARBID.

1,292,386.     Specification of Letters Patent.     Patented Jan. 21, 1919.

Application filed April 10, 1916. Serial No. 90,206.

*To all whom it may concern:*

Be it known that I, FREDERICK M. BECKET, a subject of the King of England, residing at Niagara Falls, in the county of Niagara and State of New York, have invented certain new and useful Improvements in the Manufacture of Calcium Carbid, of which the following is a specification.

This invention relates to the manufacture of calcium carbid, and particularly to improved processes and apparatus for preparing the charge for reduction in the electric furnace. My present process involves a special procedure for carrying into effect the invention disclosed and claimed in my prior United States Patent No. 1,137,567, patented April 27, 1915.

According to said patent, aggregates suitable for furnacing are prepared by mixing lime with a suitable coking coal, in proper proportions as therein defined, and subjecting the mixture to heat under ordinary coking conditions. According to the present improvements aggregates of the desired character are prepared under special coking conditions which permit of a continuous or semi-continuous operation, whereby certain important advantages are secured, as hereinafter pointed out. Although my invention is not restricted thereto, I prefer to carry out the complete process, including the burning of the lime, the preparation of the lime-coal mixture, and the production of the aggregates by coking, in an essentially continuous operation in the course of which a highly advantageous heat-interchange may be effected; to wit, a portion of the heat of the freshly burned lime may be carried forward into the coking operation, while the combustion gases from the coking operation (either before or after extraction of by-products) are available for use in the lime-burning operation, or in the coking operation, as may be desired.

My invention will be described in one specific illustrative embodiment, and in connection with apparatus as shown in the accompanying drawing, wherein the figure is a longitudinal central section. In said drawing—

1 represents a rotary lime kiln which may be of any ordinary type, and 2 a blower or equivalent means for supplying the fuel necessary for calcining the limestone. The nature of this fuel is not material to the invention, but fine coal is suitable for the purpose; although as pointed out later, this may be supplemented or replaced by gases evolved during the coking process. The hot lime, indicated at 3, is continuously delivered to appropriate crushing devices, for example crushing rolls 4, which may be water-cooled, and are located at the bottom of a hopper 5 inclosed by a casing 6. The crushed and still highly heated lime is delivered from the rolls to a suitable mixing conveyer 7, to which is also delivered, through a hopper 8, the required proportion of any suitable bituminous material. This is preferably a coking coal of the character described in my prior patent above referred to, or a mixture containing a sufficient proportion of such coal, or of other bituminous material, to permit the formation of strong aggregates under the described conditions. In some cases the bituminous coal may be wholly or partly replaced by peat. The present invention is not restricted to the use of any particular carbonaceous material or mixture, provided the mixture thereof with the requisite proportion of lime is capable of yielding sufficiently strong aggregates by coking.

The conveyer 7 delivers the hot mixture of lime and bituminous material to a conveying system having the essential characteristic that the mixture to be coked is maintained in a relatively quiescent state, that is to say, it is not subjected to material agitation or stirring while it is being transported through the coking zone. As a diagrammatic illustration of one type of conveying system conforming to this requirement, I have illustrated a continuous chain of relatively shallow cars or receptacles 9, which may be moved continuously or intermittently by any desired means (not shown), in a direction preferably counter to that of the gases. Additional means for heat supply are provided as indicated at 10, 10 adjacent the exit end of the coking chamber, and, if desired, elsewhere in this chamber, the flame passing in contact with or impinging upon the charge in the receptacles 9, and providing conditions for complete coking during the time of transit of these receptacles through the heated zone. The coked mixture, which is now in the form of hard and strong aggregates of the character described in my prior patent, is discharged into a conveyer indicated at 11, to be transported to the carbid furnaces. It is possible therefore to supply the charge to the carbid furnaces in a highly heated state.

The gases and volatile products produced during the coking of the mixture, together with the gases of combustion of any fuel introduced at 10, 10, may if desired be conveyed by a flue 12 to a by-product plant (not shown) where the values, including ammonia, are recovered. The combustible gases arising from the coking operation, whether or not they have been subjected to a by-product recovery operation, are utilized either in the coking process, or in the burning of the lime, as may be desired.

In the coking operation, as described above, the lime-coal mixture is conveyed without substantial agitation through a coking zone, wherein its temperature is progressively increased, and is discharged after being subjected to a full coking heat, usually about 1,000° C. more or less. Under these conditions the coking may be very rapidly accomplished, and the time of transit of the mixture through the coking zone is so regulated as to afford sufficiently strong aggregates. In general, the coking will be more rapid as the depth of mixture in the conveyers is less. In one specific case in which the depth of the mixture was approximately six inches, and the temperature at the discharge end was about 1,000° C., it was found that a time of transit of one hour sufficed to form aggregates of sufficient strength to endure the subsequent furnacing.

In some cases air alone may be introduced at the point or points 10, the combustion of the volatile products from the lime-coal mixture sufficing to maintain the temperature; or if necessary this may be supplemented by the introduction of fine coal or other fuel at such points; or air, or air and fuel, may be introduced at any required number of points in the coking chamber, as will be readily understood by those skilled in the art, in order properly to maintain the heating zone.

When the burning of the lime and the production of the aggregates are combined into an essentially continuous process, a very material economy of heat, and also of time, is effected. Although the heat retained by the freshly burned lime is insufficient for complete coking, its conservation results in a corresponding saving both of time and fuel in the coking process; and as before stated, heat is available in the products of the coking operation, and may be applied as desired either to burning the lime, or to continuing the coking.

It is characteristic of the preferred embodiment of the process, typified in the operation of the apparatus illustrated, that the charge is maintained in a state of relative motion during the burning of the lime, but is kept relatively at rest during the coking of the lime-coal mixture; in this way the most efficient conditions are secured for the successive stages of the process.

A mixture suitable for the production of strong aggregates in accordance with this invention is that described in my prior United States patent above referred to. Thus I may use a mixture containing about 100 to 110 parts by weight of a bituminous coal to 100 parts of lime, the coal preferably containing from 30 to 36 per cent. of volatile hydrocarbons. As described in said patent, it is in some cases practicable, when the coal is very rich in bituminous matter, to introduce with it a relatively small proportion of a carbonaceous material, such as coke or anthracite, which is high in fixed carbon and low in bitumen; but even in such case the coking coal serves as the principal or predominating source of supply for both the fixed carbon which enters into the carbid-forming reaction, and the coking binder.

It will be observed that the foregoing mixture is so proportioned that the fixed carbon of the coal will substantially suffice for the carbid-forming reaction—

$$CaO + 3C = CaC_2 + CO,$$

the bituminous component of the coal being sufficient for the production of aggregates of the necessary strength and hardness. Due allowance is of course made for the ash content of the coal and for impurities in the lime.

A mixture of sufficiently intimate character to form strong aggregates is obtained when the lumps of burned lime from the kiln are crushed to grains having an average diameter of one-eighth inch, more or less, the carbonaceous material being preliminarily crushed to a like or lesser size of particle.

As compared with the production of aggregates by a coking process carried out in a by-product oven of ordinary type, the present process offers the following advantages, among others:—

(1) It becomes practicable to mix the coal, either continuously or in successive small batches, with highly heated lime, and to subject the mixture without loss to the coking operation.

(2) The resulting mixture may be exposed in relatively shallow beds or masses to the direct action of the flame, instead of being heated in bulk through an inclosing wall. This not only affords a more efficient utilization of the heat, but a far more rapid coking is possible. For example, such shallow masses as I have referred to above may be thoroughly coked during a transit-period of one hour, as compared with fourteen to sixteen hours required for coking a full charge of the same mixture in an ordinary by-product oven.

(3) These relatively small and thoroughly coked masses can be broken into fragments suitable for furnacing with much less production of fines.

(4) The small masses are in general more uniform in character than the bulk material from a by-product oven, there being in the present case little or no tendency to the local production of fines, which tendency is common in ovens of the by-product type.

(5) The present process affords a much better control of the temperature gradient during the coking process, and this control has an important influence on the strength of the aggregates. For example, a too strong initial heating of the charge, which tends always to the production of weak aggregates, is easily avoided by introducing a large proportion, or if necessary all, of the the fuel at or near the exit end of the coking over. For the best results the charge should be heated relatively slowly at first, after which it may be brought rapidly to full temperature. This is very effectively accomplished in the present process by causing the charge to progress, either continuously or step by step, through a zone of increasing temperature.

(6) These small masses are readily and quickly cooled below the temperature of combustion of carbon in case it is desired to store the coked material. This is especially advantageous because the character of the product is such that it cannot be fully quenched with water, as is the practice in cooling the bulk material from an ordinary by-product coke oven.

A process of preparing aggregates suitable for calcium carbid manufacture comprising mixing a suitable carbonaceous material with unburned limestone, and coking the resulting mixture and driving off carbon dioxid in transit through a heating zone while avoiding stirring or agitation of the mass, is claimed in my copending application Serial No. 90,207, filed herewith.

I claim:

1. In the manufacture of calcium carbid, the process of preparing aggregates suitable for furnacing, which consists in mixing with lime a carbonaceous material serving as a source of carbon for the carbid-forming reaction and furnishing also a coking binder for the mass, and coking the resulting mixture in transit through a heating zone while avoiding stirring or agitation of the mass.

2. In the manufacture of calcium carbid, the process of preparing aggregates suitable for furnacing, which consists in mixing with lime a carbonaceous material serving as a source of carbon for the carbid-forming reaction and furnishing also a coking binder for the mass, and coking the resulting mixture in transit through a heating zone of increasing temperature while avoiding stirring or agitation of the mass.

3. In the manufacture of calcium carbid, the process of preparing aggregates suitable for furnacing, which consists in burning limestone, mixing with the highly heated lime a carbonaceous material serving as a source of carbon for the carbid-forming reaction and furnishing also a coking binder for the mass, and coking the resulting mixture in transit through a heating zone while avoiding stirring or agitation of the mass.

4. In the manufacture of calcium carbid, the process of preparing aggregates suitable for furnacing, which consists in burning limestone, mixing with the highly heated lime a carbonaceous material serving as a source of carbon for the carbid-forming reaction and furnishing also a coking binder for the mass, and coking the resulting mixture in transit through a heating zone of increasing temperature while avoiding stirring or agitation of the mass.

5. In the manufacture of calcium carbid, the process of preparing aggregates suitable for furnacing, which consists in burning limestone in continuous movement, continuously mixing with the highly heated lime a suitable coking coal in such proportions that the fixed carbon of the coal will substantially suffice for the carbid-forming reaction, said coal being sufficiently rich in bituminous matter to yield with the lime a mechanically strong aggregate suitable for furnacing, and coking the mixture in transit through a heating zone while avoiding stirring or agitation of the mass.

6. In the manufacture of calcium carbid, the process of preparing aggregates suitable for furnacing, which consists in burning limestone in continuous movement, continuously mixing with the highly heated lime a suitable coking coal in such proportions that the fixed carbon of the coal will substantially suffice for the carbid-forming reaction, said coal being sufficiently rich in bituminous matter to yield with the lime a mechanically strong aggregate suitable for furnacing, and coking the mixture in transit through a heating zone of increasing temperature while avoiding stirring or agitation of the mass.

7. In a process of preparing aggregates suitable for the production of calcium carbid, the step which consists in conveying a charge containing lime and a suitable coking coal through a coking zone while avoiding stirring or agitation thereof.

8. In a process of preparing aggregates suitable for the production of calcium carbid, the step which consists in conveying a charge containing lime and a suitable coking coal through a coking zone of increasing temperature while avoiding stirring or agitation thereof.

9. In a process of preparing aggregates suitable for the production of calcium carbid, the step which consists in conveying a charge containing lime and a suitable coking coal, in the form of a relatively shallow bed or mass, through a coking zone while avoiding stirring or agitation thereof.

10. Apparatus for continuously preparing lime-carbon aggregates suitable for furnacing, comprising continuously operable means for burning limestone, means for supplying a carbonaceous material to the highly heated lime and mixing it therewith, and means for transferring the resulting mixture, without material stirring or agitation, through a coking zone and for discharging it therefrom in the form of aggregates.

11. Apparatus for continuously preparing lime-carbon aggregates suitable for furnacing, comprising continuously operable means for burning limestone, means for crushing the highly heated lime and mixing therewith a carbonaceous material, and means for transferring the resulting mixture, without material stirring or agitation, through a coking zone and for discharging it therefrom in the form of aggregates.

In testimony whereof I affix my signature in presence of two witnesses.

FREDERICK M. BECKET.

Witnesses:
SIDNEY OTIS,
MARY SCAFE.